US012209005B2

(12) United States Patent
Yao

(10) Patent No.: US 12,209,005 B2
(45) **Date of Patent: *Jan. 28, 2025**

(54) MASON JAR SEALING DEVICE

(71) Applicant: Shanghai Xinqi Electronic Technology Co., Ltd., Shanghai (CN)

(72) Inventor: Guodong Yao, Jiangxi (CN)

(73) Assignee: Shanghai Xinqi Electronic Technology Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,165

(22) Filed: Apr. 2, 2024

(65) Prior Publication Data

US 2024/0239642 A1 Jul. 18, 2024

Related U.S. Application Data

(63) Continuation of application No. 17/944,828, filed on Sep. 14, 2022, now Pat. No. 11,981,555.

(30) Foreign Application Priority Data

Sep. 6, 2022 (CN) ........................ 202211085654.X

(51) Int. Cl.
*B65D 81/20* (2006.01)
*B67B 3/24* (2006.01)

(52) U.S. Cl.
CPC ...................................... *B67B 3/24* (2013.01)

(58) Field of Classification Search
CPC ...... B67B 3/24; B65D 81/2038; B65B 31/025
See application file for complete search history.

(56) References Cited

U.S. PATENT DOCUMENTS 2,436,849 A * 3/1948 Billetter .................... B67B 3/24
53/103
4,372,096 A * 2/1983 Baum ....................... B67B 3/24
53/103
5,651,470 A * 7/1997 Wu .......................... F16J 13/24
220/240
5,957,317 A * 9/1999 Lee .................... B65D 81/2038
220/240
6,662,831 B2 * 12/2003 Chen ....................... F04B 41/02
53/210
6,968,870 B1 * 11/2005 Tsay ........................ F04B 35/01
220/203.19

(Continued)

*Primary Examiner* — Andrew M Tecco
(74) *Attorney, Agent, or Firm* — AVEK IP, LLC

(57) ABSTRACT

A mason jar sealing device comprises a mason jar main machine and a sealing converter; the mason jar main machine comprises an isolation plate and a first sleeve, an other side of the isolation plate is arranged with a receiving cavity, and a vacuum pump is arranged in the receiving cavity, the first sleeve is used to install the first mason jar body; both ends of the seal converter are respectively arranged with a connecting part detachably connected with the first and second sleeve, and a circle lid is arranged in the second sleeve; when the mason jar body extends into the sleeve, the vacuum pump draws out the air in the mason jar body and the sleeve to seal the mason jar body and the circular lid. The disclosure can seal the mason jar by the self-contained vacuum pump, and seal the mason jars of different diameters.

18 Claims, 11 Drawing Sheets

(56) References Cited

U.S. PATENT DOCUMENTS

| | | | | |
|---|---|---|---|---|
| 7,048,136 | B2 * | 5/2006 | Havens | B65D 51/1644 222/509 |
| 7,721,771 | B2 * | 5/2010 | Tsay | B01J 3/006 141/83 |
| 8,488,314 | B1 * | 7/2013 | Ashcraft | G06F 1/1616 361/679.02 |
| 9,359,121 | B1 * | 6/2016 | Hsieh | B65D 81/2038 |
| 11,117,791 | B2 * | 9/2021 | Alipour | B67B 3/24 |
| 11,352,179 | B2 * | 6/2022 | Cabouli | G07C 9/00912 |
| 11,780,664 | B2 * | 10/2023 | Cabouli | G07C 9/00309 206/524.8 |
| 11,981,555 | B2 * | 5/2024 | Yao | B67B 3/24 |
| 2018/0251355 | A1 * | 9/2018 | Alipour | B67B 7/20 |
| 2018/0368613 | A1 * | 12/2018 | Welles | A47J 36/26 |
| 2019/0367233 | A1 * | 12/2019 | Cabouli | B65D 55/14 |

* cited by examiner

15

MASON JAR SEALING DEVICE

CROSS-REFERENCE TO RELATED APPLICATIONS

This application is a continuation application of the U.S. patent application Ser. No. 17/944,828, filed on Sep. 14, 2022, which claims priority to Chinese Patent Application No. 202211085654.X, filed on Sep. 6, 2022, the contents of which are herein incorporated by reference in their entireties.

TECHNICAL FIELD

The present disclosure relates to the technical field of mason jar sealing, in particular to a mason jar sealing device.

BACKGROUND

A Mason Jar is a glass jar with a threaded iron lid that seals well and can be used to store dry food, or to preserve food. The sealer that seals the mason jar requires an air extraction device. The above traditional sealers have the following technical problems: they are not convenient enough. Traditional mason jar sealers require additional connection to vacuum equipment, such as: sealers, electric or manual suction equipment, etc.

In view of this, overcoming the deficiencies of the prior art products is an urgent problem to be solved in the technical field.

SUMMARY

The main technical problem to be solved by the present disclosure is to provide a mason jar sealing device, which can seal the mason jar by its own vacuum pump.

The present disclosure provides a mason jar sealing device, configured to seal a mason jar body. The mason jar sealing device includes: a mason jar main machine. The mason jar main machine includes an isolation plate and a sleeve located on one side of the isolation plate, the other side of the isolation plate is arranged with a receiving cavity, and a vacuum pump is arranged in the receiving cavity, the sleeve is used to install the mason jar body, when the mason jar body extends into the sleeve, the vacuum pump draws out the air in the mason jar body and the sleeve to seal the mason jar body to the mason jar main machine. The isolation plate is arranged with an air delivery pipe, the receiving cavity is arranged with a solenoid valve and a main board. The vacuum pump is connected with the main board, the vacuum pump is connected with the air delivery pipe, and the vacuum pump draws air through the air delivery pipe. The solenoid valve is connected to the main board and is used to input gas into the sleeve when the solenoid valve is opened, so as to release the connection between the mason jar body and the mason jar main machine.

In some embodiments, the sleeve comprises a first sleeve configured to couple with the mason jar body of a first opening size and a second sleeve configured to couple with the mason jar body of a second opening size different from the first opening size. The vacuum pump is configured to draw out the air in the first sleeve to enable the first sleeve to seal with the first mason jar body. The vacuum pump is configured to draw out the air in the second sleeve to enable the second sleeve to seal with the second mason jar body.

In some embodiments, the second sleeve is arranged with a circular lid, the circular lid is arranged with a slot; when the second sleeve is coupling to the second mason jar body, the slot is configured to receive a circular can opening of the second mason jar body, and the vacuum pump is configured to draw out the air between the second mason jar body and the circular lid to attach the circular lid to the circular can opening.

In some embodiments, the mason jar main machine further comprises a connecting part, located between the first sleeve and the second sleeve; and a first sealing ring is arranged between the first sleeve and the connecting part.

In some embodiments, an upper cover is connected to the receiving cavity.

In some embodiments, a display device is arranged on the main board.

In some embodiments, a first through hole corresponding to the display device is arranged on the upper cover, the display device extends into the first through hole, and the display device is used for displaying status information in the mason jar sealing device.

In some embodiments, the main board is arranged with a charging port, and the upper cover is arranged with a second through hole corresponding to the charging port.

In some embodiments, the main board is arranged with a switch key, and the upper cover is arranged with a third through hole corresponding to the switch key.

In some embodiments, a transparent display panel is connected to the side of the upper cover away from the main board, and the transparent display panel covers the first through hole.

In some embodiments, a battery is arranged in the receiving cavity, the battery is connected to the main board, the solenoid valve, and the vacuum pump, and the battery is used to supply power to the main board, the solenoid valve, and the vacuum pump.

In some embodiments, the isolation plate comprises a base wall and a side wall protruding from a periphery of the base wall away from the sleeve, the base wall and the side wall cooperatively form the receiving cavity; and the solenoid valve, the battery, and the main board are mounted in the receiving cavity.

In some embodiments, at least one mounting portion is protruding from the base wall of the isolation plate towards the upper cover and is arranged inside the receiving cavity; and each of the solenoid valve, the battery, and the main board is mounted on a respective one of the at least one mounting portion.

In some embodiments, the main board is located above the battery and the solenoid valve.

In some embodiments, the transparent display panel is located at a middle portion of the upper cover.

In some embodiments, the charging port and the switch key are respectively located at two opposite sides of the transparent display panel.

In some embodiments, the sleeve has a receiving space for receiving the mason jar body; an inner surface of the sleeve is configured to abut against an outer surface of a portion of the mason jar body that is inserted into the sleeve.

The beneficial effects of this disclosure are: the disclosure provides a mason jar sealing device, configured to seal a mason jar body. The mason jar sealing device includes: a mason jar main machine. The mason jar main machine includes an isolation plate and a sleeve located on one side of the isolation plate, the other side of the isolation plate is arranged with a receiving cavity, and a vacuum pump is arranged in the receiving cavity, the sleeve is used to install the mason jar body, when the mason jar body extends into the sleeve, the vacuum pump draws out the air in the mason jar body and the sleeve to seal the mason jar body to the mason jar main machine. The isolation plate is arranged with an air delivery pipe, the receiving cavity is arranged with a solenoid valve and a main board. The vacuum pump is connected with the main board, the vacuum pump is connected with the air delivery pipe, and the vacuum pump draws air through the air delivery pipe. The solenoid valve is connected to the main board and is used to input gas into the sleeve when the solenoid valve is opened, so as to release the connection between the mason jar body and the mason jar main machine. In this way, the mason jar can be sealed by its own vacuum pump.

BRIEF DESCRIPTION OF THE DRAWINGS

In order to explain the technical solutions of the embodiments of the present disclosure more clearly, the following briefly introduces of the drawings that need to be used in the embodiments of the present disclosure. Obviously, the drawings described below are only some embodiments of the present disclosure, and for those of ordinary skill in the art, other drawings can also be obtained based on these drawings without creative effort.

DETAILED DESCRIPTION

Figure 1:
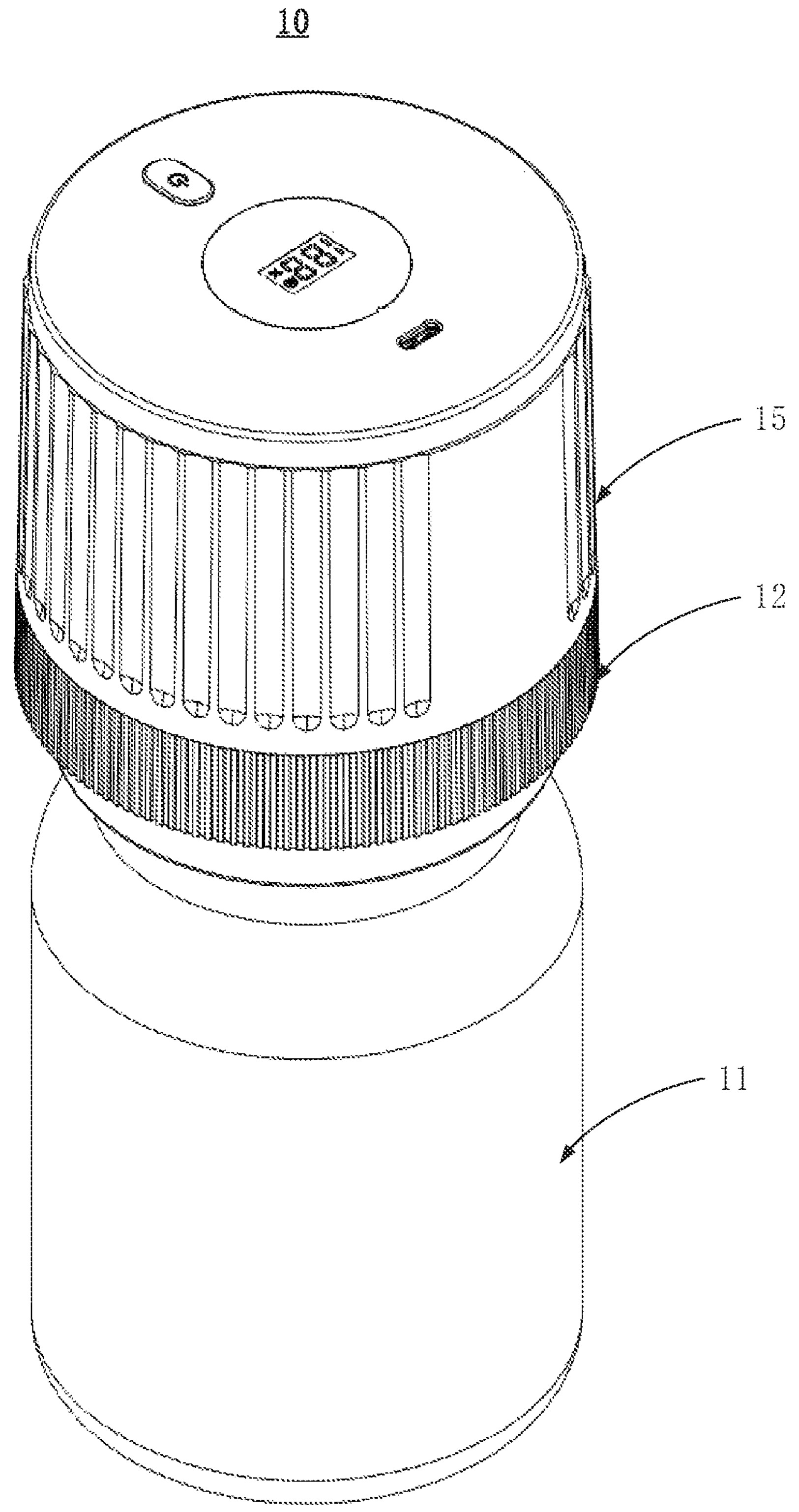
FIG. 1 is an overall structural schematic diagram of a mason jar sealing device provided by an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all of the embodiments. Based on the embodiments in the present disclosure, all other embodiments obtained by those skilled in the art without creative work fall within the protection scope of the present disclosure.

In the description of this application, it should be understood that the terms "center", "longitudinal", "lateral", "length", "width", "thickness", "upper", "lower", "front", "rear", "left", "right", "vertical", "horizontal", "top", "bottom", "inside", "outside", etc. which indicate the orientation or positional relationship is based on the orientation shown in the drawings, and only for the convenience of describing the present disclosure and simplifying the description, rather than indicating or implying that the indicated device or element must have a specific orientation, be constructed and operated in a specific orientation, and therefore should not be construed as a limitation on the present disclosure. In addition, the terms "first" and "second" are only used for descriptive purposes, and should not be construed as indicating or implying relative importance or implying the number of indicated technical features. Thus, features defined as "first", "second" may expressly or implicitly include one or more features. In the description of the present disclosure, "plurality" means two or more, unless otherwise expressly and specifically defined.

In this application, the word "exemplary" is used to mean "serving as an example, illustration, or illustration." Any embodiment described in this application as "exemplary" is not necessarily to be construed as preferred or advantageous over other embodiments. The following description is presented to enable any person skilled in the art to make and use the present disclosure. In the following description, details are set forth for the purpose of explanation. It is to be understood that one of ordinary skill in the art can realize that the present disclosure may be practiced without the use of these specific details. In other instances, well-known structures and procedures have not been described in detail so as not to obscure the description of the present disclosure with unnecessary detail. Therefore, this application is not intended to be limited to the embodiments shown but is to be accorded the widest scope consistent with the principles and features disclosed herein.

It should be noted that, since the methods in the embodiments of the present disclosure are executed in electronic devices, the processing objects of each electronic device exist in the form of data or information, such as time, which is essentially time information. It can be understood that in subsequent embodiments, If the size, quantity, location, etc. are mentioned, the corresponding data exists for processing by the electronic device, and details are not repeated here.

Figure 2:
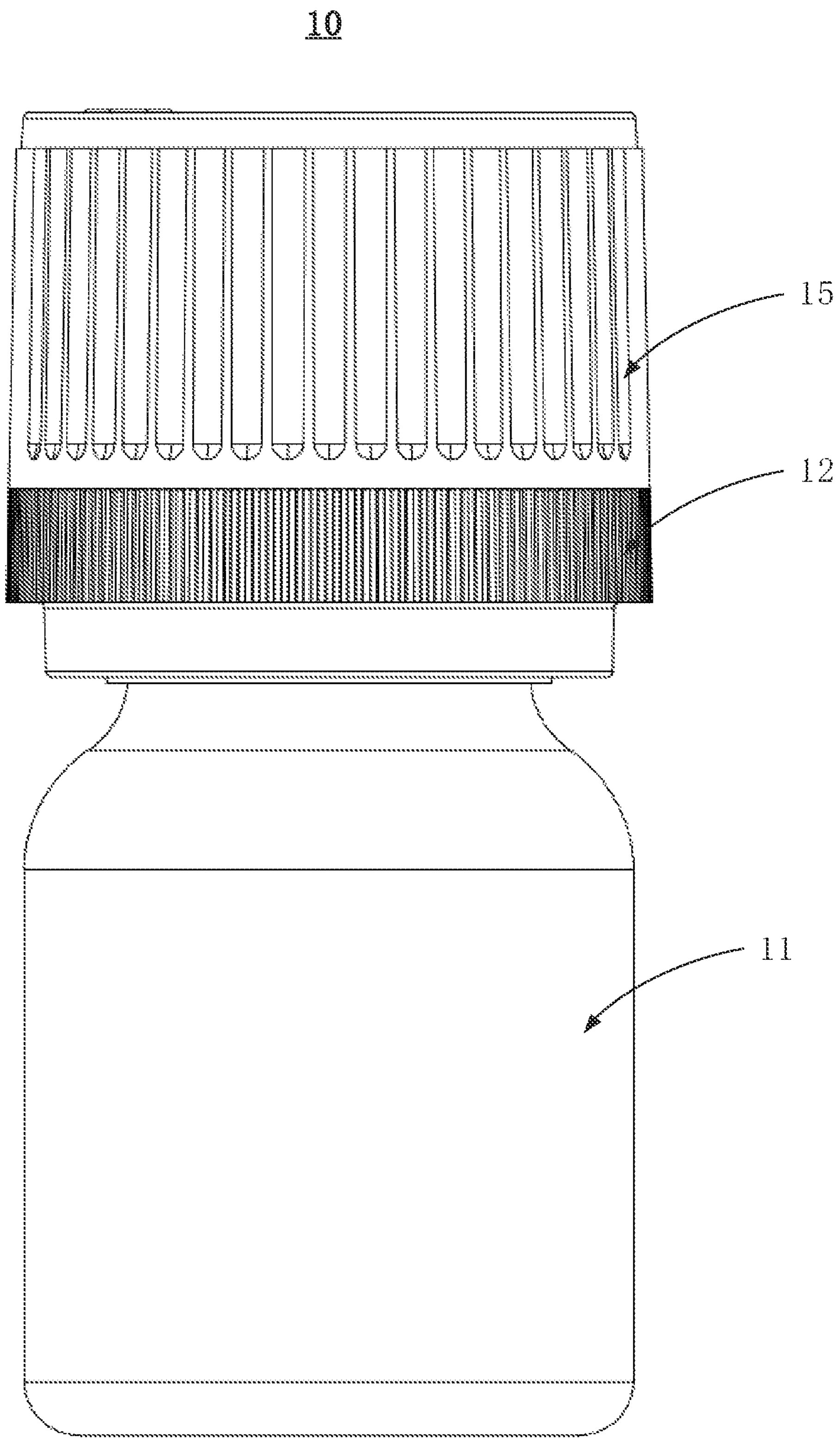
FIG. 2 is a side view of a mason jar sealing device provided by an embodiment of the present disclosure.
Figure 3:
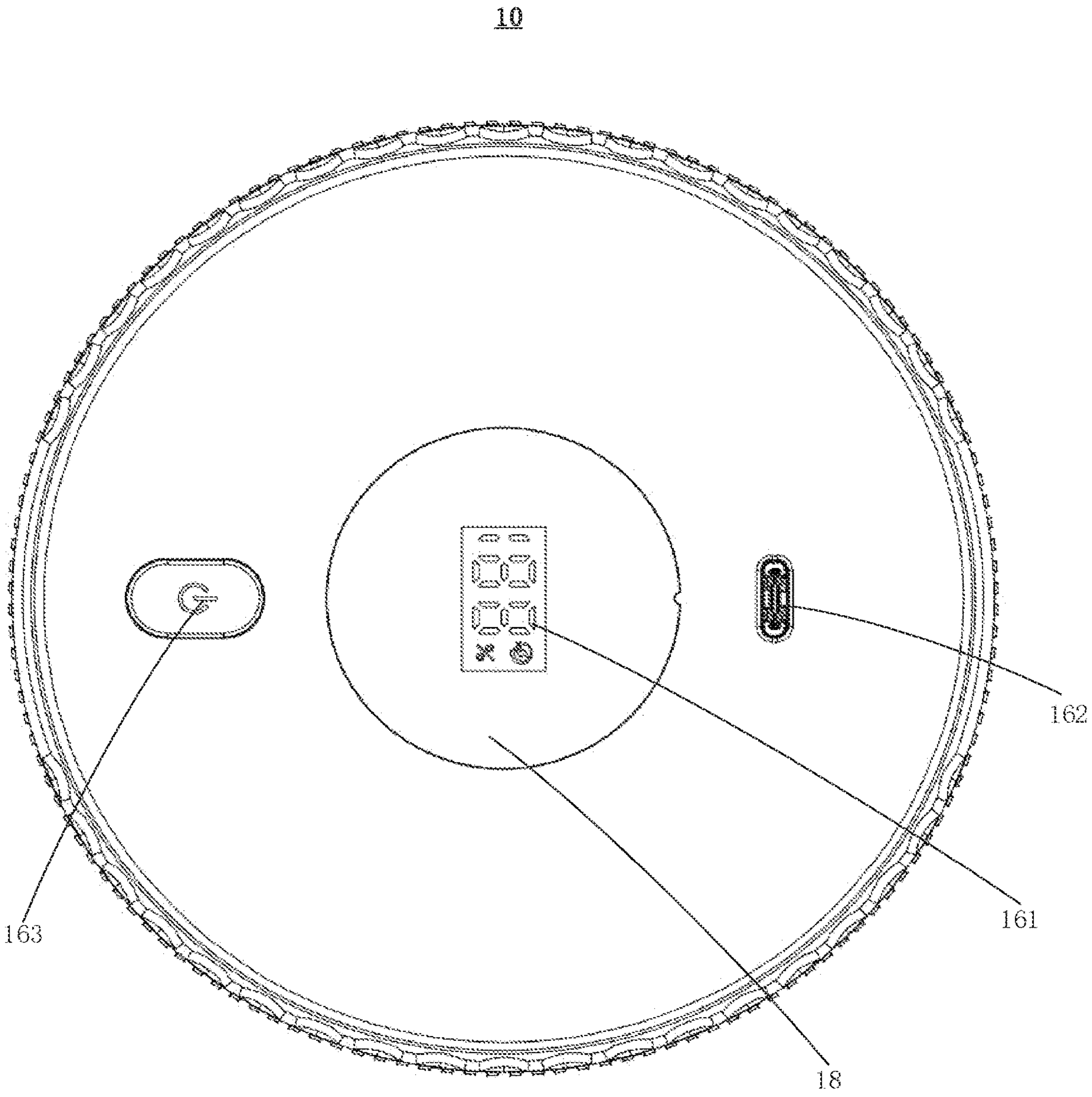
FIG. 3 is a top view of a mason jar sealing device provided by an embodiment of the present disclosure.
Figure 4A:
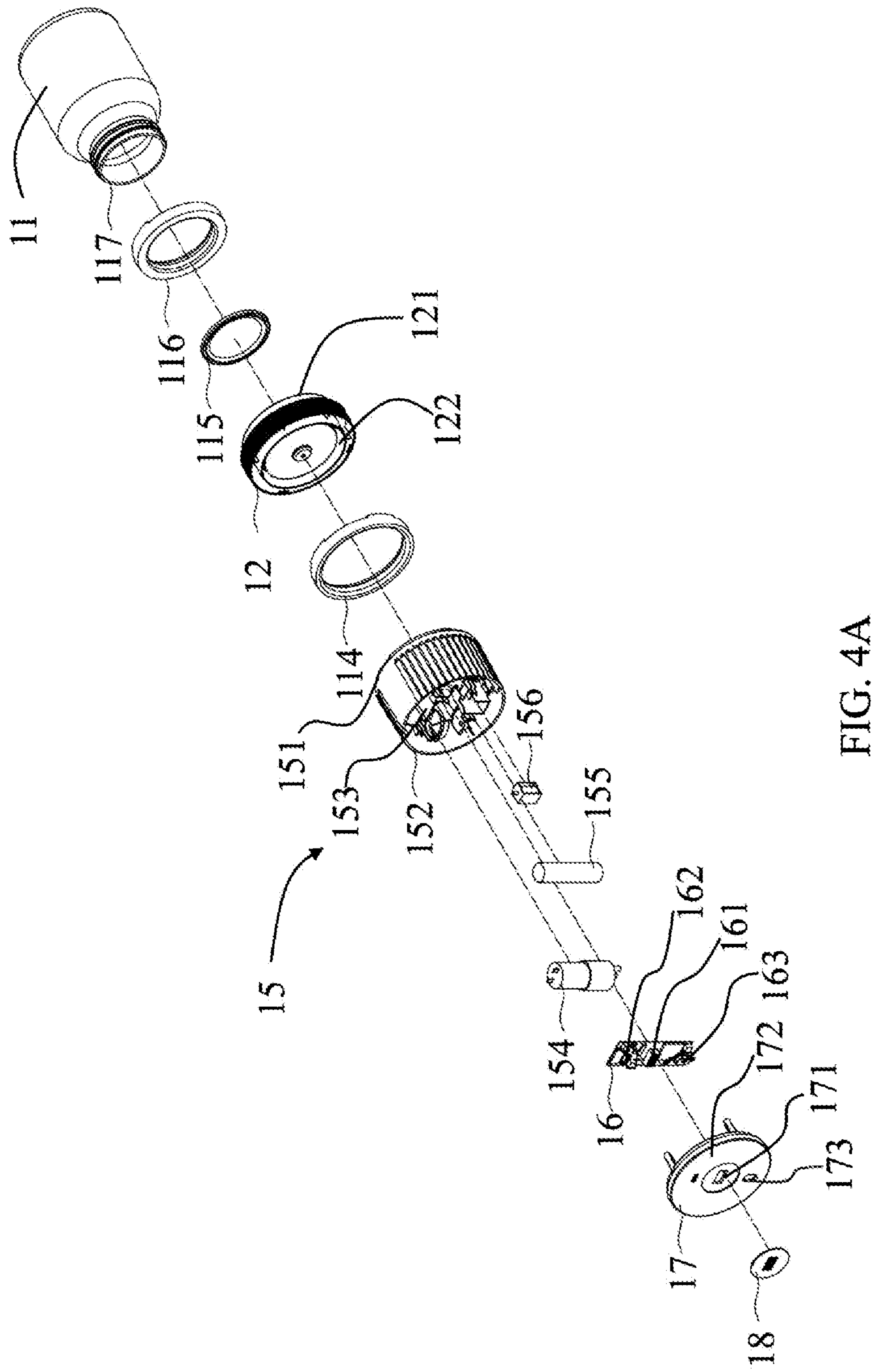
FIG. 4A is an explosion schematic diagram of a mason jar sealing device provided by an embodiment of the present disclosure.
Figure 4B:
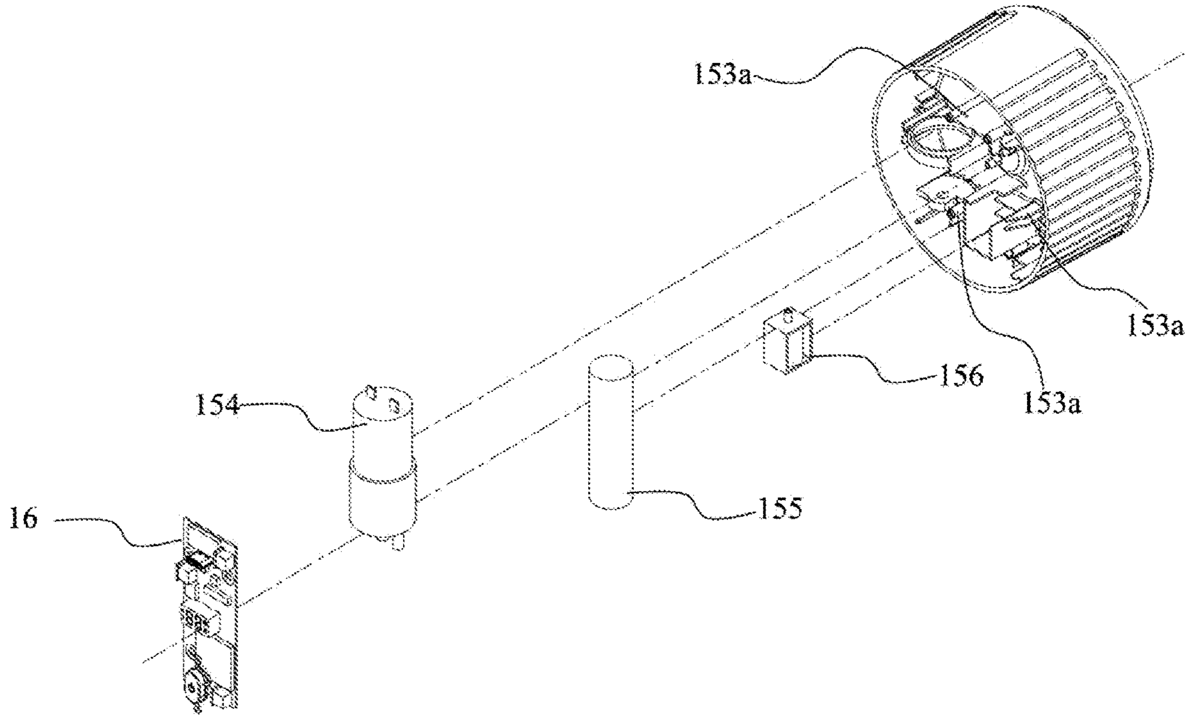
FIG. 4B is an enlarged view of a portion of the mason jar sealing device in the FIG. 4A.
Figure 5:
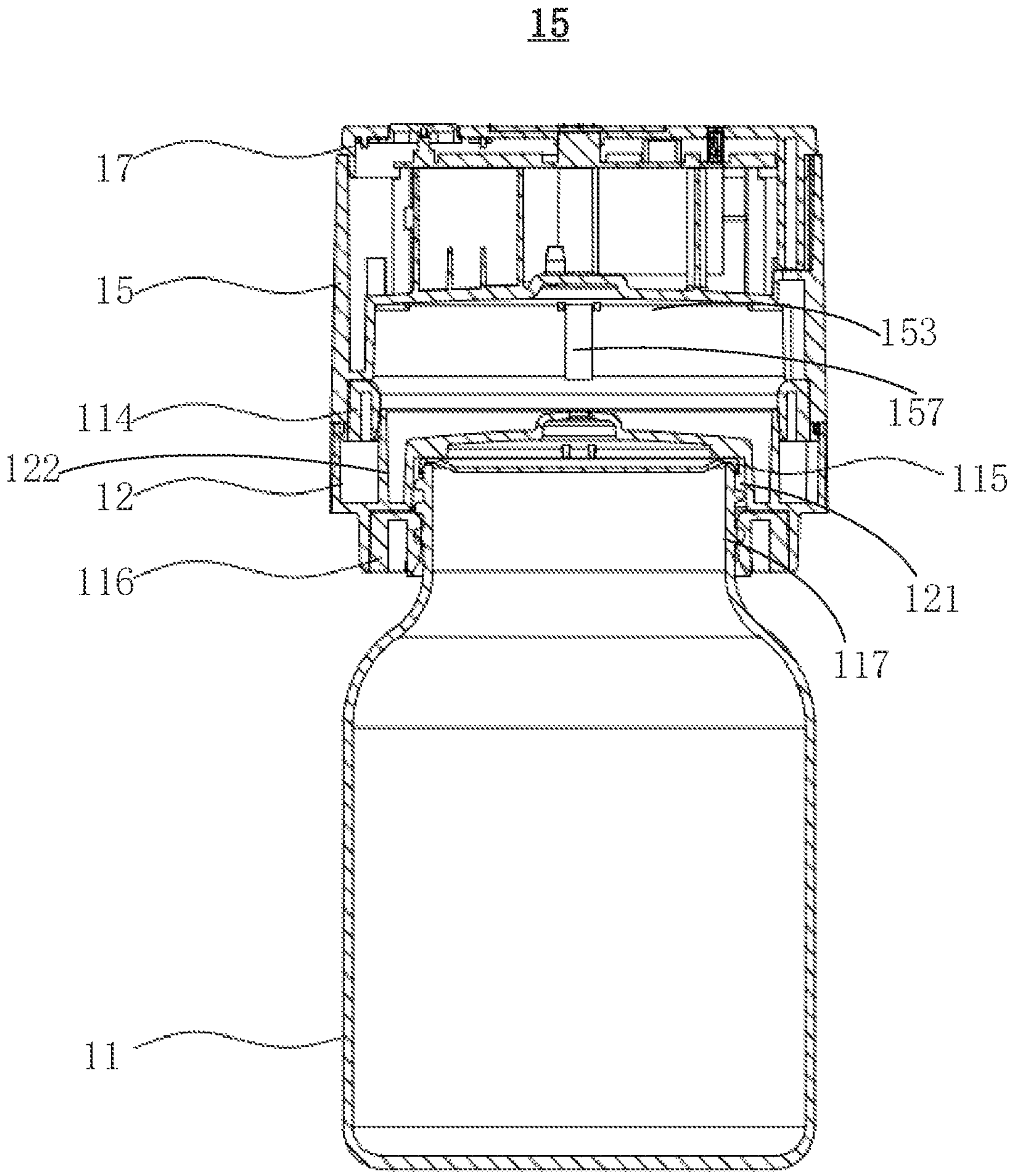
FIG. 5 is a section schematic diagram of a mason jar sealing device provided by an embodiment of the present disclosure.
Figure 6:
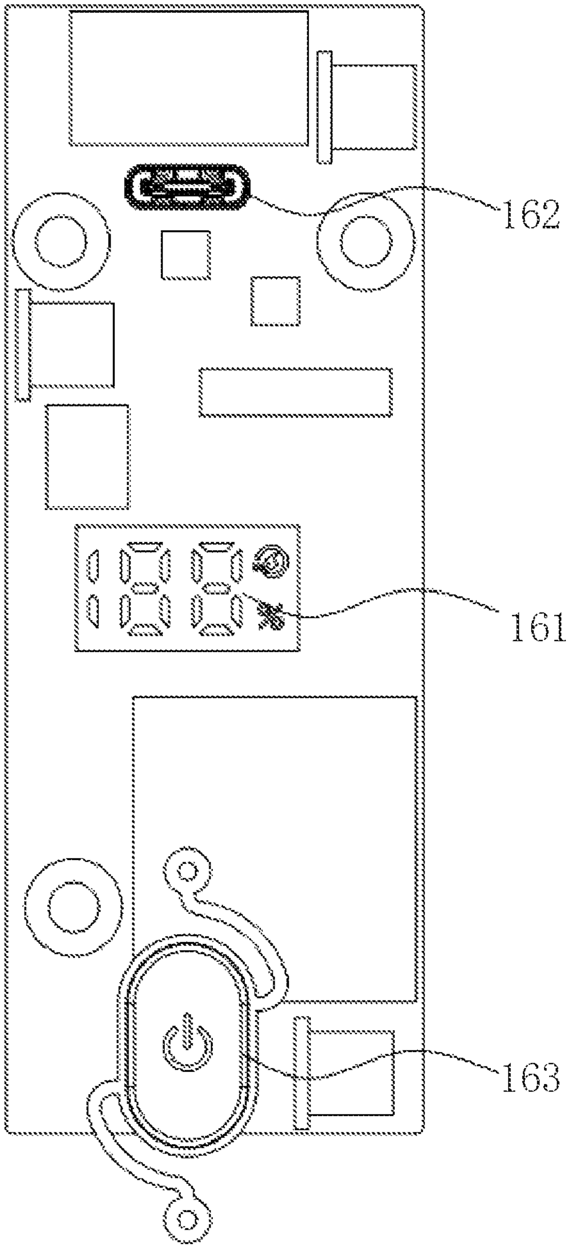
FIG. 6 is a schematic diagram of the main board in the mason jar sealing device provided by an embodiment of the present disclosure.
Figure 7:
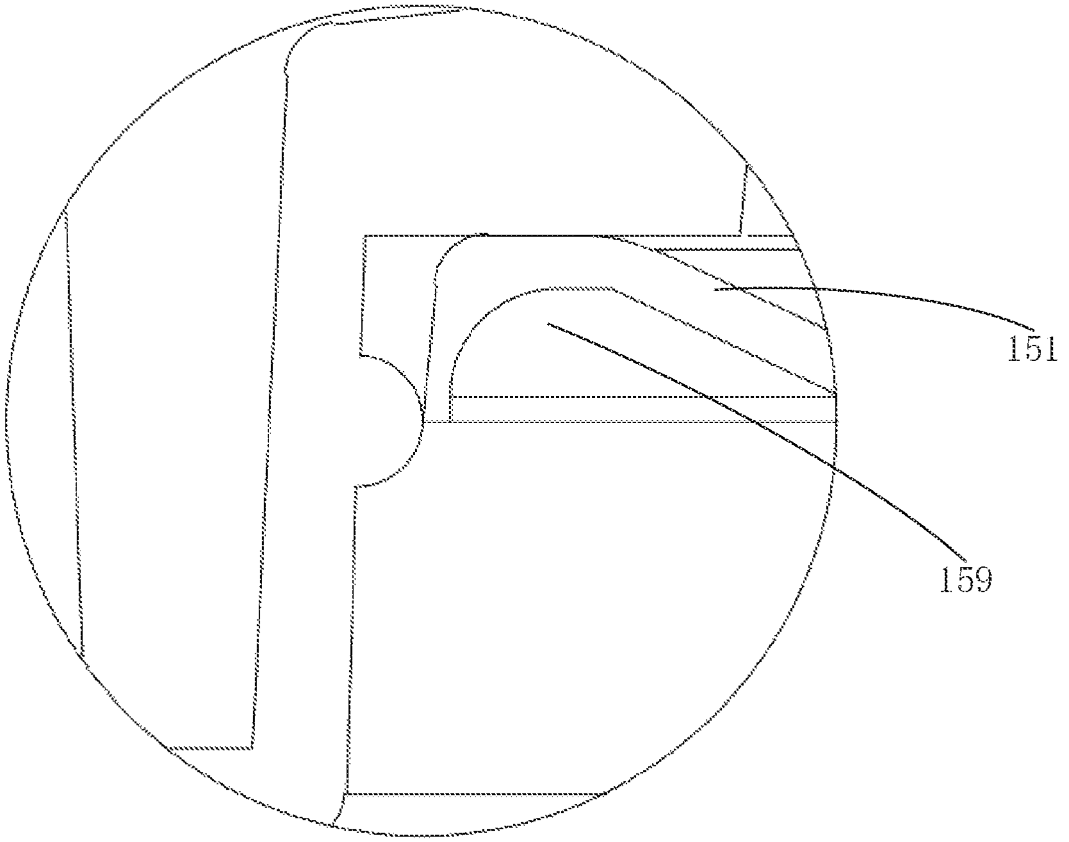
FIG. 7 is a structure schematic diagram of the circular lid in the mason jar sealing device provided by an embodiment of the present disclosure.
Figure 8:
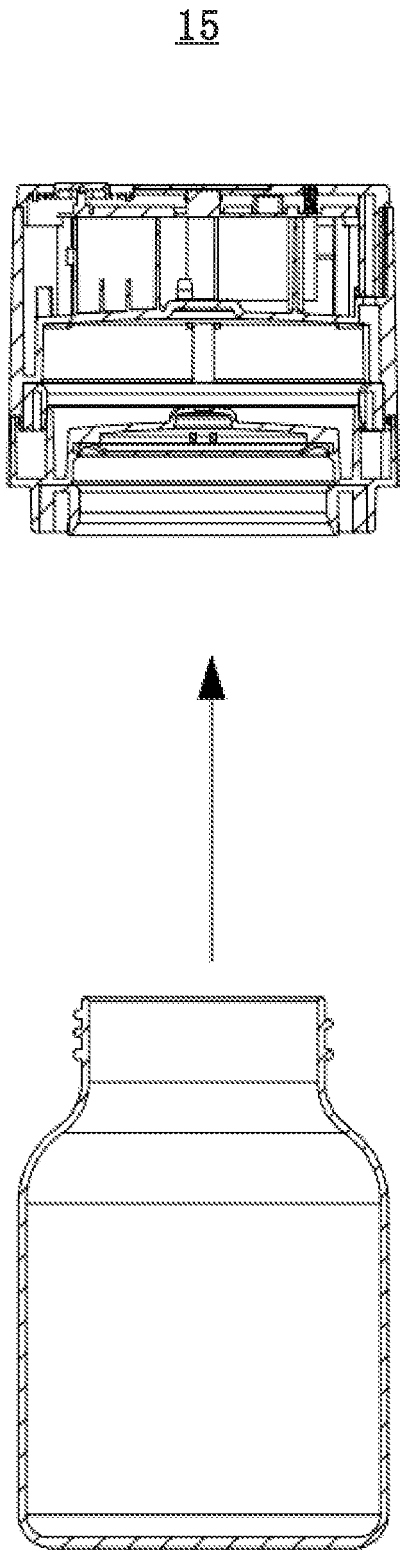
FIG. 8 is a structural schematic diagram of the card slot on the circular lid in the mason jar sealing device provided by an embodiment of the present disclosure.
Figure 9:
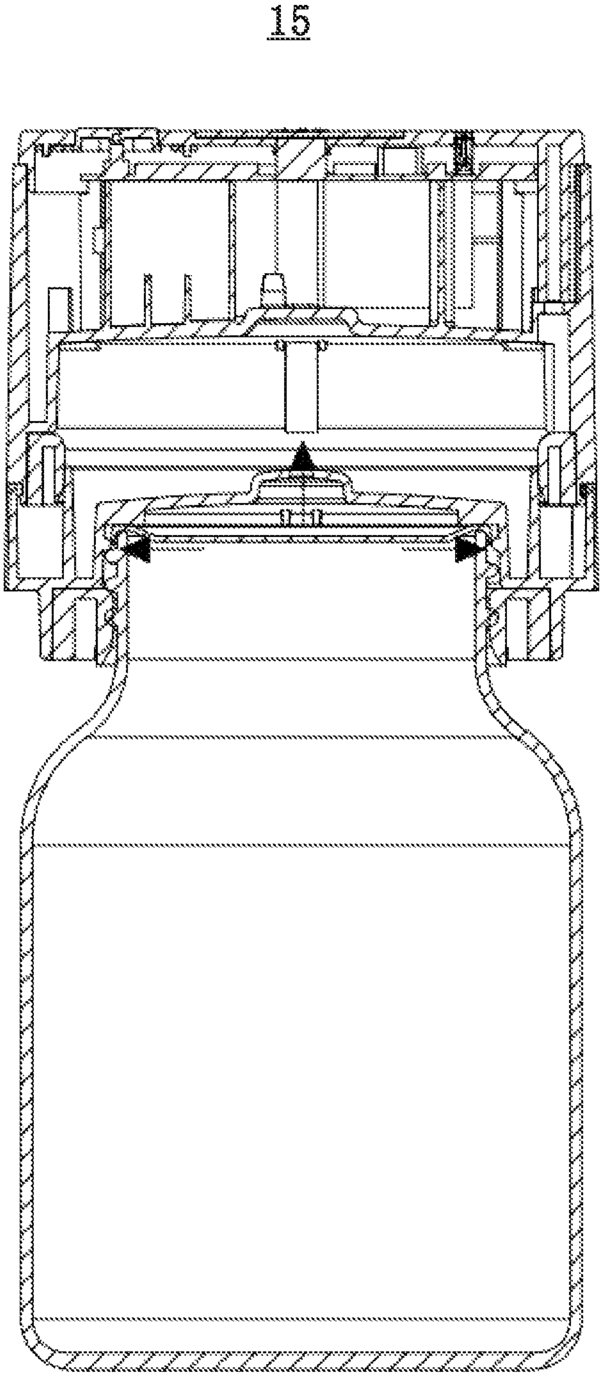
FIG. 9 is a structural schematic diagram of the connection between the second mason jar body and the mason jar main machine after the vacuum pump in the mason jar sealing equipment provided by the embodiment of the present disclosure.
Figure 10:
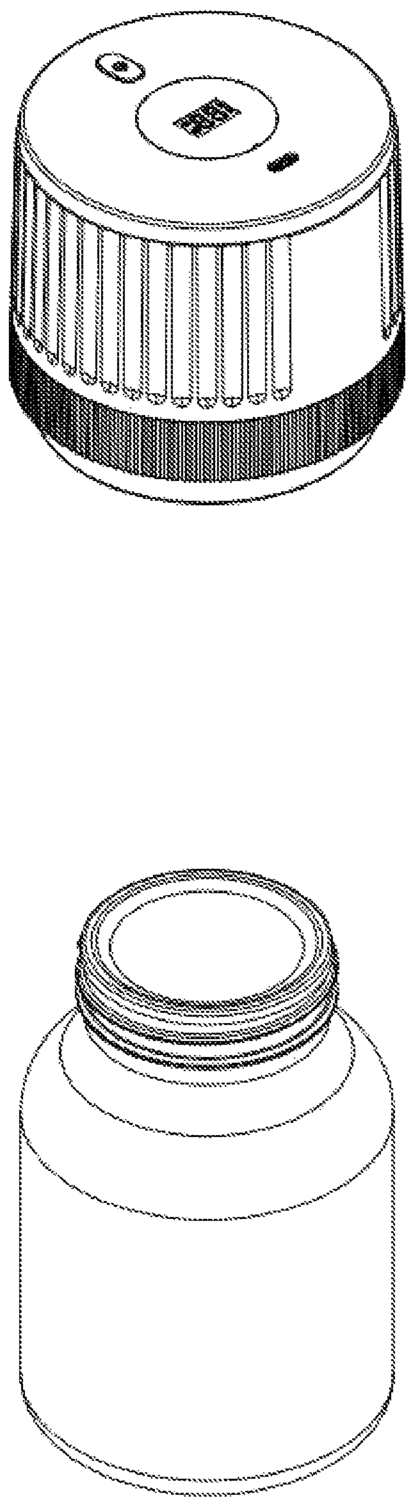
FIG. 10 is a structural schematic diagram of the separation of the second mason jar body from the mason jar main machine when the solenoid valve is opened in the mason jar sealing device provided in the embodiment of the present disclosure.

Refer to FIG. 1-FIG. 9, FIG. 1 is an overall structural schematic diagram of a mason jar sealing device provided by an embodiment of the present disclosure. FIG. 2 is a side view of a mason jar sealing device provided by an embodiment of the present disclosure. FIG. 3 is a top view of a mason jar sealing device provided by an embodiment of the present disclosure. FIG. 4A is an explosion schematic diagram of a mason jar sealing device provided by an embodiment of the present disclosure. FIG. 4B is an enlarged view of a portion of the mason jar sealing device in the FIG. 4A. FIG. 5 is a section schematic diagram of a mason jar sealing device provided by an embodiment of the present disclosure. FIG. 6 is a schematic diagram of the main board in the mason jar sealing device provided by an embodiment of the present disclosure. FIG. 7 is a structure schematic diagram of the circular lid in the mason jar sealing device provided by an embodiment of the present disclosure. FIG. 8 is a structural schematic diagram of the card slot on the circular lid in the mason jar sealing device provided by an embodiment of the present disclosure. FIG. 9 is a structural schematic diagram of the connection between the second mason jar body and the mason jar main machine after the vacuum pump in the mason jar sealing equipment provided by the embodiment of the present disclosure. FIG. 10 is a structural schematic diagram of the separation of the second mason jar body from the mason jar main machine when the solenoid valve is opened in the mason jar sealing device provided in the embodiment of the present disclosure.

This embodiment provides a mason jar sealing device 10, the mason jar sealing device 10 is used for sealing a mason jar body. The mason jar sealing device 10 comprises a mason jar main machine 15 configured to connect to the mason jar body.

The mason jar main machine 15 comprises an isolation plate 153 and a sleeve located on one side of the isolation plate 153. The mason jar body is inserted into the sleeve to be sealed to the mason jar main machine 15. The other side of the isolation plate 153 is arranged with a receiving cavity 152, and a vacuum pump 154 is arranged in the receiving cavity 152, the sleeve is used to install the mason jar body, when the mason jar body extends into the sleeve, the vacuum pump 154 draws out the air in the mason jar body and the sleeve to seal the mason jar body to the mason jar main machine 15.

In some embodiments, as shown in FIG. 5, the sleeve has a receiving space for receiving the mason jar body. An inner surface of the sleeve is configured to abut against an outer surface of a portion of the mason jar body that is inserted into the sleeve.

In some embodiments, the mason jar sealing device 10 may be capable of sealing a first mason jar body and a second mason jar body 11 with different diameters. Wherein the structures of the first mason jar body and the second mason jar body 11 are similar, only the specifications are different. For example, the first mason jar body is a tank with a wide mouth diameter, and the second mason jar 11 is a tank with a standard caliber.

Specifically, the sleeve includes a first sleeve 151 and a second sleeve 121, and the mason jar sealing device 10 further includes a sealing converter 12. A side of the sealing converter 12 may be connected to the mason jar main machine 15, and the other side of the sealing converter 12 may be configured to connect to one of the two mason jar bodies having a diameter matching with a size of the other side of the sealing converter 12.

Specifically, the sleeve includes a first sleeve 151 and a second sleeve 121, and the mason jar sealing device 10 further includes a sealing converter 12. Both ends of the seal converter 12 are respectively arranged with a connecting part 122 and the second sleeve 121. The second sleeve 121 matches with the second mason jar body 11. The connecting part 122 is located between the first sleeve 151 and the second sleeve 121. For example, the connecting part 122 may be detachably connected to the first sleeve 151.

When the first mason jar body extends into the first sleeve 151, the vacuum pump 154 draws out the air in the first mason jar body and the first sleeve 151 to seal the first mason jar body to the mason jar main machine 15. When the second mason jar body 11 extends into the second sleeve 121, the vacuum pump 154 draws out the air in the second mason jar body 11 and the second sleeve 121 to connect the second mason jar body 11 and the second sleeve 121, and then seal the second mason jar body 11 to the mason jar main machine 15.

In the embodiment of the present disclosure, the vacuum pump 154 is evacuated, the air in the second mason jar body 11 and the second sleeve 121 is evacuated, the pressure in the second mason jar body 11 is reduced, and the atmospheric pressure presses the second mason jar body 11 in the first sleeve 151, seals the first mason jar body to the mason jar main machine 15.

In the embodiment of the present disclosure, the second mason jar body 11 comprises a circular can opening 117, and when the circular can opening 117 extends into the second sleeve 121, a second sealing ring 116 is arranged between the circular can opening 117 and the second sleeve 121. The second sealing ring 116 can strengthen the sealing between the circular can opening 117 and the second sleeve 121.

In the embodiment of the present disclosure, a circle lid 115 is arranged in the second sleeve 121, the circular lid 115 is arranged with a slot 159, and when the circular can opening 117 extends into the second sleeve 121, the circular can opening 117 extends into the slot 159, and the vacuum pump 154 removes the air between the second mason jar body 11 and the circular lid 115 to attach the circular lid 115 to the circular can opening 117. The second mason jar body 11 and the circular lid 115 are sealed. The circular can opening 117 extending into the slot 159 can enhance the sealing between the circular can opening 117 and the second sleeve 121.

The vacuum pump 154 is evacuated, the gas in the second mason jar body 11 and the second sleeve 121 is evacuated, the pressure in the second mason jar body 11 is reduced, and the atmospheric pressure pushes the circular can opening 117 of the second mason jar body 11 in the slot 159, the circular lid 115 is affected by the pressure and is attached to the circular can opening 117, and the first mason jar body is sealed to the mason jar main machine 15.

In the embodiment of the present disclosure, a first sealing ring 114 is arranged between the first sleeve 151 and the connecting part 122. The first sealing ring 114 can enhance the sealing between the first sleeve 151 and the connecting part 122.

In the embodiment of the present disclosure, an upper cover 17 is detachably connected to the receiving cavity 152, a main board 16 is arranged in the receiving cavity 152, a display device 161 is arranged on the main board 16, and a first through hole 171 corresponding to the display device 161 is arranged on the upper cover 17, the display device 161 extends into the first through hole 171, and the display device 161 is used for displaying status information in the mason jar sealing device 10. The status information in the mason jar sealing device 10 may be remaining power, charging prompt, working time, and the like. The main board 16 is used to control various functional elements.

In the embodiment of the present disclosure, the main board 16 is arranged with a charging port 162 and a switch key 163, and the upper cover 17 is arranged with a second through hole 172 corresponding to the charging port 162 and a third through hole 173 corresponding to the switch key 163. The charging port 162 is exposed through the second through hole 172 to facilitate charging; the switch key 163 is exposed through the third through hole 173 to facilitate control operations.

In the embodiment of the present disclosure, a transparent display panel 18 is detachably connected to the side of the upper cover 17 away from the main board 16 , and the transparent display panel 18 covers the third through hole 173 . The transparent display panel 18 covers the first through hole 171 , which is convenient for people to observe on the one hand, and can protect the display device 161 in the first through hole 171 on the other hand.

In the embodiment of the present disclosure, the isolation plate 153 is arranged with an air delivery pipe 157, the vacuum pump 154 is connected with the main board 16, the vacuum pump 154 is connected with the air delivery pipe 157, and the vacuum pump 154 draws air through the air delivery pipe 157.

In the embodiment of the present disclosure, the receiving cavity 152 is arranged with a solenoid valve 156, the solenoid valve 156 is connected to the main board 16, and the solenoid valve 156 is used to input gas into the first sleeve 151 when it is opened, so as to release the connection between the first mason jar body and the mason jar main machine 15, and the connection between the second mason jar body 11 and the mason jar main machine 15.

In the embodiment of the present disclosure, a battery 155 is arranged in the receiving cavity 152, the battery 155 is connected to the main board 16, the solenoid valve 156, and the vacuum pump 154, and the battery 155 is used to supply power to the main board 16, the solenoid valve 156, and the vacuum pump 154.

In more detail, as shown in FIG. 5, the isolation plate 153 includes a base wall and a side wall protruding from a periphery of the base wall away from the sleeve. The base wall and the side wall cooperatively form the receiving cavity. The solenoid valve 156, the battery 155, and the main board 16 are all mounted in the receiving cavity. Furthermore, at least one mounting portion 153*a* is protruding from the base wall of the isolation plate towards the upper cover and is arranged inside the receiving cavity; and each of the solenoid valve 156, the battery 155, and the main board 16 is mounted on a respective one of the at least one mounting portion 153*a*. The main board 16 is located above the battery 155 and the solenoid valve 156. The transparent display panel 18 is located at a middle portion of the upper cover 17. The charging port 162 and the switch key 163 are respectively located at two opposite sides of the transparent display panel 18.

In the embodiment of the present disclosure, the vacuum pump 154 performs air extraction, the air in the 70 mason jar is drawn out from the gap between the 50 lid and the 70 mason jar opening, the negative pressure in the 70 mason jar increases, and the 50 lid is affected by the pressure and fits on the 70 mason jar opening.

The working principle of the mason jar sealing device 10 of the present disclosure is as follows:

As shown in FIG. 8, the circular can opening 117 is first extended into the slot 159.

As shown in FIG. 9, the vacuum pump 154 is evacuated, the gas in the second mason jar body 11 and the second sleeve 121 is evacuated, the pressure in the second mason jar body 11 is reduced, and the atmospheric pressure pushes the second mason jar body 11. The circular can opening 117 is pressed into the slot 159, the circular lid 115 is pressed against the circular can opening 117 under the influence of the pressure, and the first mason jar body is sealed to the mason jar main machine 15.

As shown in FIG. 10, when the solenoid valve 156 is opened, the gas enters the first sleeve 151, and then enters the second mason jar body 11, the internal pressure of the second mason jar body 11 increases, and the pressure difference between the inside and outside of the second mason jar body 11 decreases, the second mason jar body 11 is separated from the mason jar main machine 15, and the disassembly of the second mason jar body 11 is completed.

The disclosure provides a mason jar sealing device, the mason jar sealing device use for sealing a first mason jar body and a second mason jar body with different diameters, and comprises a mason jar main machine and a sealing converter; the mason jar main machine comprises an isolation plate and a first sleeve located on one side of the isolation plate, an other side of the isolation plate is arranged with a receiving cavity, and a vacuum pump is arranged in the receiving cavity, the first sleeve is used to install the first mason jar body, when the first mason jar body extends into the first sleeve, the vacuum pump draws out the air in the first mason jar body and the first sleeve to seal the first mason jar body to the mason jar main machine; both ends of the seal converter are respectively arranged with a connecting part detachably connected with the first sleeve and a second sleeve matched with the second mason jar body, and a circle lid is arranged in the second sleeve; when the second mason jar body extends into the second sleeve, the vacuum pump draws out the air in the second mason jar body and the second sleeve to connect the second mason jar body and the second sleeve, and then seal the second mason jar body to the mason jar main machine. The disclosure can seal the mason jar by its own vacuum pump, and seal mason jars with different diameters.

The above description is only an embodiment of the present disclosure, and is not intended to limit the scope of the patent of the present disclosure. Any equivalent structure or equivalent process transformation made by using the contents of the description and drawings of the present disclosure, or directly or indirectly applied to other related technologies fields are similarly included within the scope of patent protection of this disclosure.

What is claimed is:

1. A mason jar sealing device, configured to seal a mason jar body, the mason jar sealing device comprising: a mason jar main machine;

wherein, the mason jar main machine comprises a side wall and an isolation plate arranged inside and connected to the side wall, the isolation plate and a portion of the side wall disposed at a side of the isolation plate away from the mason jar body define a receiving cavity, and a vacuum pump and a solenoid valve are arranged in the receiving cavity, another portion of the side wall disposed at another side of the isolation plate near the mason jar body is connected to a sleeve to install the mason jar body, the mason jar body is arranged with a circular lid which is spaced apart from the isolation plate and is configured to cover an opening of the mason jar body, when the mason jar body extends into the sleeve, the vacuum pump draws out air in the mason jar body and the sleeve to enable the circular lid to be attached to the mason jar body by atmospheric pressure;

wherein the another portion of the side wall and the another side of the isolation plate cooperatively define a sealing space, the isolation plate is arranged with an air delivery pipe, and the receiving cavity is arranged with a main board;

the vacuum pump is connected with the main board, the vacuum pump is connected with the air delivery pipe, and the vacuum pump draws air through the air delivery pipe;

the air delivery pipe fluidly connects the vacuum pump with the sealing space through the isolation plate, and when the vacuum pump draws out the air, the air delivery pipe is spaced apart from the circular lid; and the solenoid valve is connected to the main board and is used to input gas into the sleeve when the solenoid valve is opened, so as to release the connection between the mason jar body and the mason jar main machine.

2. The mason jar sealing device according to claim 1, wherein:

the sleeve comprises a first sleeve configured to couple with the mason jar body of a first opening size and a second sleeve configured to couple with the mason jar body of a second opening size different from the first opening size;

the vacuum pump is configured to draw out the air in the first sleeve to enable the first sleeve to seal with the first mason jar body; and the vacuum pump is configured to draw out the air in the second sleeve to enable the second sleeve to seal with the second mason jar body.

3. The mason jar sealing device according to claim 2, wherein the second sleeve is arranged with the circular lid, the circular lid is arranged with a slot; when the second sleeve is coupling to the second mason jar body, the slot is configured to receive a circular can opening of the second mason jar body, and the vacuum pump is configured to draw out the air between the second mason jar body and the circular lid to attach the circular lid to the circular can opening.

4. The mason jar sealing device according to claim 2, wherein the mason jar main machine further comprises a connecting part, located between the first sleeve and the second sleeve; and a first sealing ring is arranged between the first sleeve and the connecting part.

5. The mason jar sealing device according to claim 1, wherein an upper cover is connected to the receiving cavity.

6. The mason jar sealing device according to claim 5, wherein, a display device is arranged on the main board.

7. The mason jar sealing device according to claim 6, wherein, a first through hole corresponding to the display device is arranged on the upper cover, the display device extends into the first through hole, and the display device is used for displaying status information in the mason jar sealing device.

8. The mason jar sealing device according to claim 7, wherein a transparent display panel is connected to the side of the upper cover away from the main board, and the transparent display panel covers the first through hole.

9. The mason jar sealing device according to claim 8, wherein the transparent display panel is located at a middle portion of the upper cover.

10. The mason jar sealing device according to claim 8, wherein charging port and switch key are respectively located at two opposite sides of the transparent display panel.

11. The mason jar sealing device according to claim 5, wherein the main board is arranged with a charging port, and the upper cover is arranged with a through hole corresponding to the charging port.

12. The mason jar sealing device according to claim 11, wherein the main board is arranged with a switch key, and the upper cover is arranged with another through hole corresponding to the switch key.

13. The mason jar sealing device according to claim 5, wherein a battery is arranged in the receiving cavity, the battery is connected to the main board, the solenoid valve, and the vacuum pump, and the battery is used to supply power to the main board, the solenoid valve, and the vacuum pump.

14. The mason jar sealing device according to claim 13, wherein the isolation plate comprises a base wall and a side wall protruding from a periphery of the base wall away from the sleeve, the base wall and the side wall cooperatively form the receiving cavity; and the solenoid valve, the battery, the vacuum pump, and the main board are mounted in the receiving cavity.

15. The mason jar sealing device according to claim 14, wherein at least one mounting portion is protruding from the base wall of the isolation plate towards the upper cover and is arranged inside the receiving cavity; and each of the solenoid valve, the battery, and the vacuum pump is mounted on a respective one of the at least one mounting portion.

16. The mason jar sealing device according to claim 13, wherein the main board is located above the battery and the solenoid valve.

17. The mason jar sealing device according to claim 13, wherein the solenoid valve is located between the battery and the vacuum pump.

18. The mason jar sealing device according to claim 1, wherein the sleeve has a receiving space for receiving the mason jar body; an inner surface of the sleeve is configured to abut against an outer surface of a portion of the mason jar body that is inserted into the sleeve.

* * * * *